United States Patent [19]

Carson et al.

[11] 4,135,859

[45] Jan. 23, 1979

[54] POLLUTION CONTROL DEVICE ADAPTED FOR ATTACHMENT TO RESERVOIR GLAND STUFFING BOXES

[75] Inventors: Forrest L. Carson; Joe F. Rives, both of Borger, Tex.

[73] Assignee: J. M. Huber Corporation, Borger, Tex.

[21] Appl. No.: 791,242

[22] Filed: Apr. 27, 1977

Related U.S. Application Data

[63] Continuation of Ser. No. 600,752, Jul. 30, 1975, abandoned.

[51] Int. Cl.$^2$ .............................................. F04B 49/10
[52] U.S. Cl. .................................... 417/9; 277/2; 417/33; 417/37; 417/63
[58] Field of Search ................... 417/9, 33, 37, 63; 277/2; 128/214 E, 214 F, 276, 278; 137/403, 405, 406

[56] References Cited

U.S. PATENT DOCUMENTS

| | | | |
|---|---|---|---|
| 638,960 | 12/1899 | Coryell | 417/37 X |
| 2,377,185 | 5/1945 | Russel | 417/37 |
| 2,550,093 | 4/1951 | Smith | 417/33 X |
| 2,786,418 | 3/1957 | Peck | 417/37 X |
| 2,915,975 | 12/1959 | Kittrell et al. | 417/9 |
| 3,180,134 | 4/1965 | Wadlington | 417/9 X |
| 3,715,173 | 2/1973 | Froeschner | 417/37 |
| 3,914,752 | 10/1975 | Howard et al. | 277/2 X |

Primary Examiner—John J. Vrablik
Assistant Examiner—Edward Look
Attorney, Agent, or Firm—August E. Roehrig, Jr.; Harold H. Flanders

[57] ABSTRACT

An oil reservoir gland stuffing box employed to extend the service life of the packing by providing an oil reservoir to maintain essential lubrication is provided with an attached container which will receive the overflow of the oil reservoir should the packing begin to leak excessively threatening thereby to create a pollution problem. A predetermined overflow actuates a weight sensitive micro-switch wired to shut off the pumping unit and/or send a warning signal to a remote control station. The control switch incorporates a manual re-set provision to prevent the pumping unit from restarting until the well has been serviced.

8 Claims, 4 Drawing Figures

POLLUTION CONTROL DEVICE ADAPTED FOR ATTACHMENT TO RESERVOIR GLAND STUFFING BOXES

This is a continuation of application Ser. No. 600,752, filed July 30, 1975 now abandoned.

BACKGROUND OF THE INVENTION

1. Field of the Invention

In general, the present invention relates to pollution control devices for oil wells and more specifically to such devices adapted for employment on and attachment to reservoir gland stuffing boxes.

2. Description of the Prior Art

The prior art in this area has suffered from a general inability to function effectively in cold weather. This difficulty arises from the fact that the prior art has tended to employ devices such as float controls which are rendered inoperative by significant increases in the viscosity of the oil as occasioned by cold weather which may "freeze" the float position allowing an extensive spill to occur without detection or prevention.

SUMMARY OF THE INVENTION

Accordingly, it is an object of the present invention to provide a new, highly effective device which overcomes the deficiencies of the prior art as described above.

It is a further object of the present invention to provide a pollution control device capable of operating in cold as well as in warm weather.

Another object of the present invention is to provide a device the operation of which is not critically dependent upon the viscosity of the excess oil.

Other objects and a fuller understanding of the present invention may be had by referring to the following description taken in conjunction with the accompanying drawings and claims.

The present invention overcomes the deficiencies of the prior art and achieves its objectives by providing for the interruption of power to the pumping unit and/or for the sending of a warning signal to a remote control station upon the activation of a weight sensitive microswitch by a predetermined weight of oil overflowing the oil reservoir into a spring mounted, suspended container connected to the oil reservoir.

BRIEF DESCRIPTION OF THE DRAWINGS

In order to facilitate the understanding of the present invention, reference will now be made to the appended drawings of preferred embodiments of the present invention. The drawings should not be construed as limiting the invention, but are exemplary only. In the drawings.

DESCRIPTION OF THE PREFERRED EMBODIMENT

Figure 1:
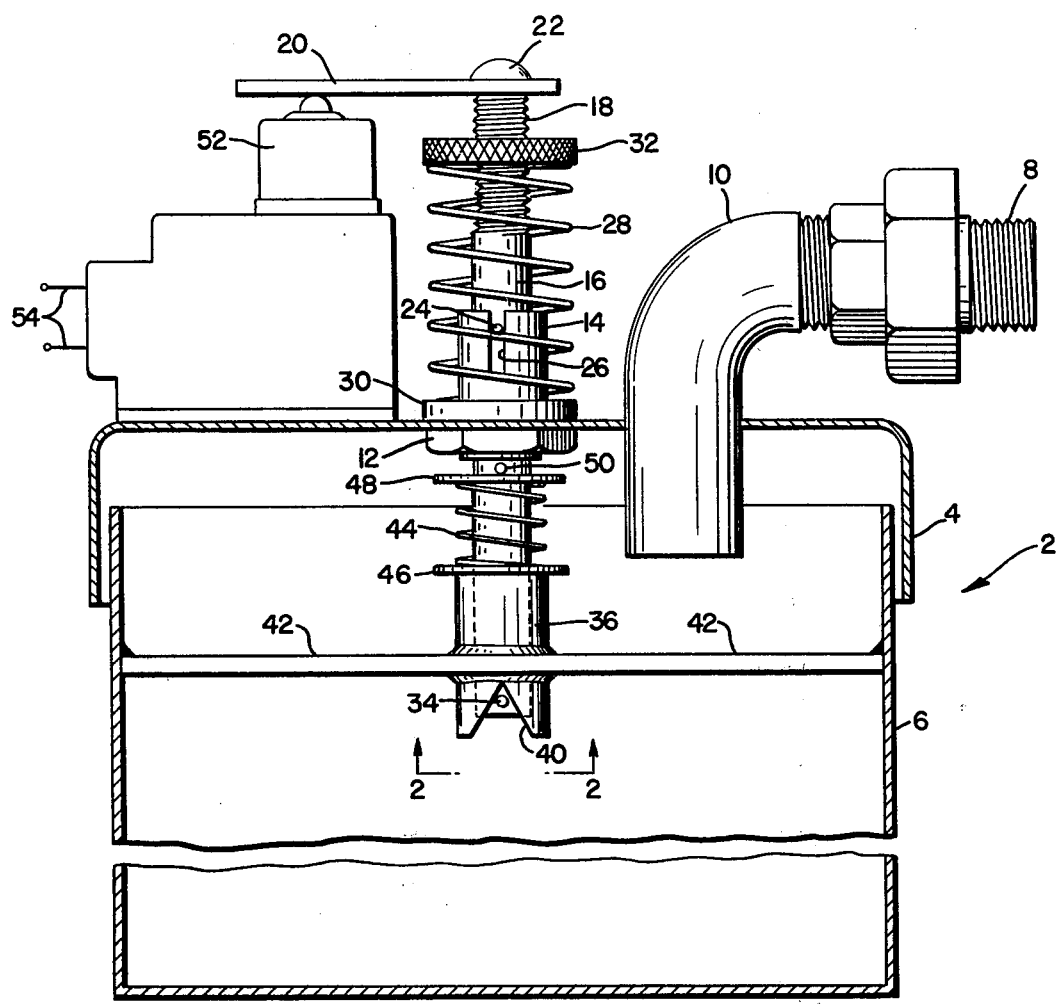
FIG. 1 is a partial cross-sectional representation of the anti-pollution control device, stuffing box adapter of the present invention.
Figure 2:
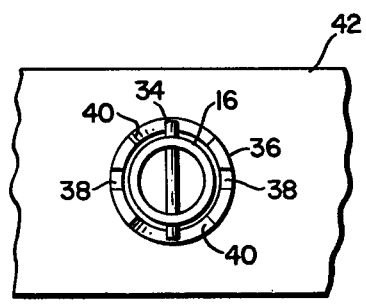
FIG. 2 is a partial section view, A—A, of the coupling device of the present invention.

A preferred embodiment of the present invention is shown in FIG. 1. A cylindrical container indicated generally at 2 consisting of an upper portion 4 and lower portion 6 is provided to catch any excessive overflow or leakage from the oil reservoir (not shown) of the stuffing box of an oil well polished rod.

Suitable oil reservoir glands are well known in the art, a typical example being disclosed in U.S. Pat. No. 2,857,183 to S. P. Tschappat, Oct. 21, 1958. Such oil reservoirs typically have or may easily be provided with suitable threaded overflow plugs to allow for attachment of container 2 by means of threaded coupler 8 of elbow pipe 10 which is rigidly affixed to and passes through the upper portion 4 and into container 2 to provide for the flow of excess oil from the oil reservoir of the stuffing box into container 2. Threaded coupler 8 and elbow pipe 10 thus support and provide a fixed positioning of the upper portion 4 of container 2 with respect to the oil reservoir of the stuffing box.

Centrally disposed in the upper portion 4 of container 2 is coupling nut 12 and sleeve 14 which define a central opening through which shaft 16 passes.

Shaft 16 is threaded at its upper end with threads 18 and tapped at its top end to allow attachment of lever arm 20 by screw 22.

Within the longitudinal or axial dimension of sleeve 14 a pin 24 is set through shaft 16. Pin 24 is constrained in its rotational freedom of motion by guide slot 26 in sleeve 14 which allows controlled up and down, longitudinal or axial movement of pin 24 and shaft 16.

Surrounding shaft 16 is a spring 28 disposed between a shoulder 30 on sleeve 14 and an adjustable nut 32 on threads 18. Adjustable nut 32 allows the desired degree of compression to be placed on spring 28 and thus allows for a variable resistance to be provided by spring 28 to the pulling of shaft 16 downward in the direction of the lower portion of container 2 by the weight of the excess oil in the lower portion 6 of container 2.

Shaft 16 is provided with means for fixedly engaging and suspending the lower portion 6 of container 2 by pin 34 which is inserted into sleeve 36 through slots 38 and upon rotation through a 90° angle engages notches 40 in sleeve 36 which is attached by support 42 to the side walls of lower portion 6 of container 2. Pin 34 is retained in the notches 40 by the applied bias of spring 44 disposed between washers 46 and 48 and pin 50 in and through shaft 16.

With the lower portion 6 of container 2 thus attached to central shaft 16 the weight of any excess oil passed into the lower portion 6 of container 2 through elbow pipe 10 pulls central shaft 16 downward in opposition to the biasing effect of spring 28 to bring lever arm 20 into contact and ultimately to trigger switch 52 which causes through electrical means attached to electrical hookup wires 54 a termination of pumping and/or the sending of a remote signal, the lighting of signal lamps, the sounding of warning horns or the like.

A typical suitable switch 52 may, for example, be a 15 ampere, 125-250 volts a.c. "Micro-Switch", "L2" such as may be obtained from the Micro-Switch Division of Honeywell Corporation. Any other suitable switch may, of course, be employed.

In describing the present invention springs, pins passing through the shaft, and similar details have been referred to, however, any of the known means of achieving the same functions as herein disclosed may be employed.

Referring to FIG. 3, several schematic electrical alternatives in accordance with the present invention are disclosed.

Figure 3A:
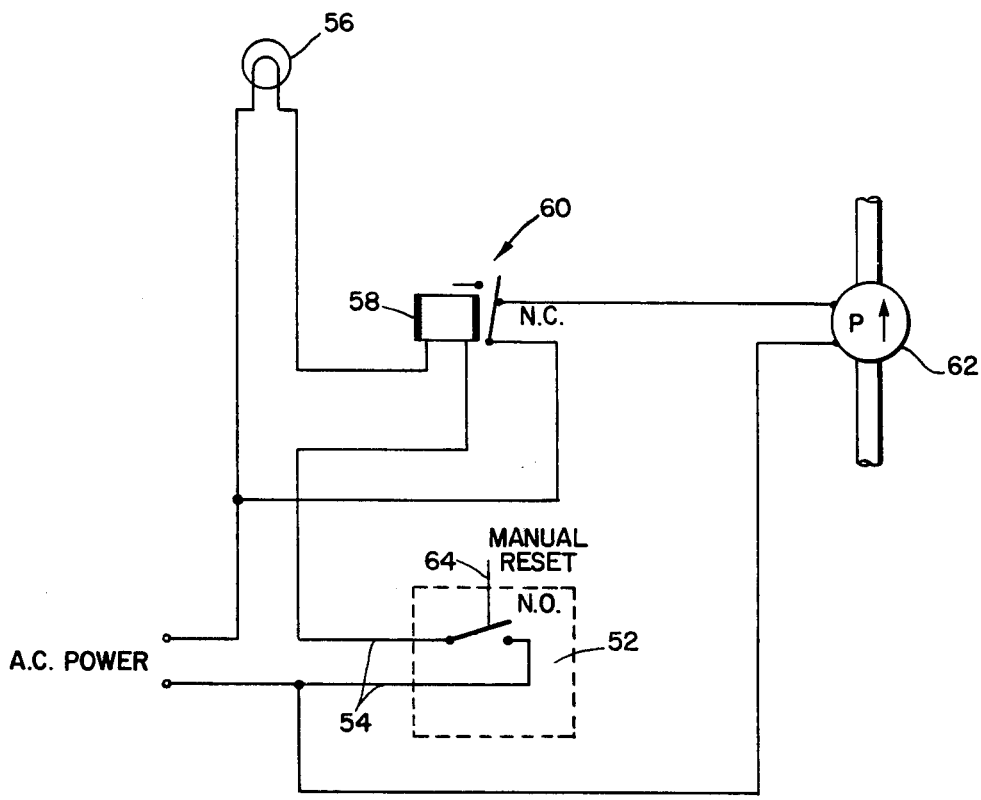
FIGS. 3a and 3b contain electrical diagrams indicating circuit operations of the present invention.

In FIG. 3a, micro-switch 52 which "normally" provides an open circuit to signal lamp 56 and with regard to any circuit necessary or desired to terminate pumping will upon being closed by passing current through the ceil 58 of a relay 60 cause the relay 60 to shut off power to pump 62 and may optionally provide power to lamp 56 as an indication of a potential pollution problem.

Any suitable switch may be employed including non-explosive switches.

Figure 3B:
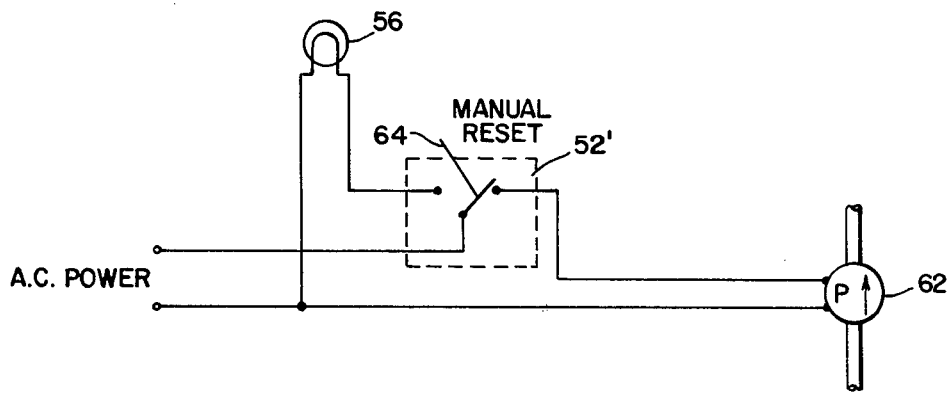

In FIG. 3b, a single pole, double throw switch is indicated at 52' which upon triggering by sufficient weight in container 2 serves to disconnect power to pump 62 and to supply power to indicator lamp 56 or the like.

In FIGS. 3a and 3b switches 52 and 52' may of course be provided with manual re-set means 64 to prevent the pumping unit 62 from restarting until the well has been serviced.

In operation, power is shut off to the pumping unit 62 and the brake set on the unit and an oil reservoir gland adapted to receive the overflow container 2 of the present invention installed after an initial inspection of the stuffing box packings to detect and replace any such packings that are worn or damaged. The overflow container 2 is attached to the oil reservoir gland with the container 2 in the vertical position by means of threaded coupler 8 on elbow pipe 10.

Electrical connections 54 are suitably interconnected with the existing well circuits as taught by FIGS. 3a and 3b and the accompanying descriptions above so that actuation of switch 52 (52') will serve to shut off power to the pumping unit 62 and/or to send a warning signal upon actuation as by lighting an indicator lamp 56.

The spring compression of spring 28 is adjusted by adjusting the nut 32 so that lever arm 20 will actuate switch 52 when the overflow container 2 has its lower portion 6 from ¼ to ¾ full. Tightening nut 32 will increase the weight of fluid required to actuate switch 52.

The oil reservoir gland may then be filled with an oil, such as an SAE 90, suitable to lubricate the packing. The oil reservoir gland should be considered "full" when the lubricating oil starts to overflow into container 2. For practice, it is desirable that the level of lubricating oil be checked regularly as a loss of oil may indicate packing deterioration.

Having made the above adjustments and any necessary packing adjustments the brake on the well may be removed and power turned on to the pumping unit 62.

The device may be initially checked for proper operation by manually pulling down on the lower portion 6 of the overflow container 2 until lever arm 20 actuates switch 52 shutting down the pump 62 and/or lighting indicator lamp 56 or similar warning signals and indicators.

During normal operation of the pump 62, spring 28 will hold the weight of lower portion 6 of overflow container 2 up by shaft 16 in such a position that lever arm 20 does not engage or actuate switch 52 and the related circuits as described above.

Upon the development of a leak in the packing such that excessive oil fills the oil reservoir and overflows into elbow pipe 10 and thence into the lower portion 6 of overflow container 2, weight begins to build up in the lower portion 6 of container 2.

As excess oil builds up in the lower portion 6 of container 2, the weight of this oil begins to overcome the bias of spring 28 and pull shaft 16 downward through sleeve 14 thereby lowering and eventually bringing lever arm 20 into contact with switch 52.

When the weight of the excess oil is sufficient to activate switch 52, the power is cut off to pump 62 and power provided to such remote indicator and signal devices such as indicator lamp 56 and the like.

Upon servicing the well, the lower portion 6 of container 2 may be removed by pulling down slightly against the bias of spring 44 on the lower portion 6 of overflow container 2 and rotating the same lower portion 6 of overflow container 90° with respect to the fixed upper portion 4 of overflow container 2.

The lower portion 6 of overflow container 2 may then be emptied of excess oil and upon repair of the leaking packing or related problem the lower portion 6 of container 2 may be reinstalled by aligning the center slots 38 with the pin 34 of central shaft 16, pushing upward and rotating 90°, with respect to the fixed upper portion 4 of the overflow container 2.

As the electrical switch 52 preferably incorporates a manual reset it may be necessary to regain power to the pump 62 after switch 52 has been actuated to depress or otherwise actuate a reset button preferably located inside and underneath the upper portion 4 of overflow container 2.

In summary, the present invention provides for the interruption of power to the pumping unit of an oil well and/or for the sending of a warning or indicator signal to a remote station upon the activation of a weight sensitive switch by a predetermined weight of oil overflowing the oil reservoir into a spring mounted, suspended container connected to the oil reservoir.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt to a particular situation or to adapt a material to the teachings of the invention without departing from its essential teachings. Therefore, although specific preferred embodiments of the present invention have been described in the detailed description above, the description is not intended to limit the invention to the particular forms or embodiments disclosed herein. The invention is declared to cover all changes and modifications of the specific examples of the invention disclosed herein which do not constitute departures from the spirit and scope of the invention as defined by the appended claims.

What is claimed is:

1. An anti-pollution adapter for attachment to an oil reservoir lubricating gland of a stuffing box for an oil well polished rod of an oil well pump comprising
   container means for retaining oil overflow from an oil reservoir lubricating gland of a stuffing box and having an upper portion for fixed attachment to the oil reservoir lubricating gland and a lower portion movable relative to said upper portion in response to the quantity of oil contained therein,
   conduit means for fixedly connecting said upper portion of said container means with the oil reservoir and delivering overflow oil from the oil reservoir lubricating gland of a stuffing box to said container means,
   spring biased coupling means secured to one of said portions of said container means and operatively connected to the other one of said portions of said container means for suspending said lower portion thereof from said fixedly connected upper portion, and switch means actuable upon movement of said lower portion of said container means relative to said upper portion thereof in response to the accumulation of a predetermined quantity of overflow oil therein.

2. The apparatus of claim 1 wherein said spring biased coupling means includes a rod secured to one of said portions of said container means and operatively connected to the other one of said portions of said container means, and a coil spring carried about at least a portion of said rod and operatively connected thereto for biasing said lower portion of said container means in a direction opposed to the movement thereof in response to the accumulation of overflow oil therein.

3. The apparatus of claim 2 further including means for adjustably positioning the spring force of said coil spring to vary the amount of accumulation of overflow oil in said container means effective to actuate said switch means.

4. The apparatus of claim 3 wherein said rod is operatively connected to said switch means by means of an arm secured to said rod and extending radially outward therefrom for engagement with said switch means.

5. An improved anti-pollution adapter for attachment to an oil reservoir lubricating gland of a stuffing box for an oil well polished rod of an oil well wherein the oil is at least in part lifted by a pump wherein the improved anti-pollution adapter comprises conduit means for delivering overflow from an oil reservoir to a container means having relatively movable upper and lower portions for containing said overflow, said conduit means fixedly connecting said upper portion of said container means to said oil reservoir and adapted to deliver said overflow into said container means, switch means actuable to shut off the pump in response to a predetermined weight of overflow being delivered to said container means including a spring biased rod means operatively connected between said lower portion of said container means and said upper portion of said container means by spring means for suspending said lower portion of said container means relative to said upper portion of said container means against the weight of said overflow, and means operatively connected to said rod means for actuating said switch means in response to said predetermined weight of overflow being delivered to said lower portion of said container means as measured by the movement of said spring biased rod means.

6. An improved anti-pollution adapter for attachment to an oil reservoir lubricating gland of a stuffing box for an oil well polished rod of an oil well wherein the oil is at least in part lifted by a pump wherein the improved anti-pollution adapter comprises means for delivering overflow from the oil reservoir to a means for containing the same including pipe means fixedly connecting an upper portion of a container to the oil reservoir and adapted to deliver the overflow into said container, and means for actuating a switch to shut off the pump in response to a predetermined weight of overflow being delivered to said container including spring biased and suspended connecting means for suspending a lower portion of said container comprising a rod with a pin therethrough for making spring biased notched connection with a notched member affixed within said lower portion of said container and means for actuating said switch in response to a predetermined weight of overflow being delivered to the said lower portion of said container as measured by the compression of said spring.

7. An improved anti-pollution adapter according to claim 6 wherein said means for actuating said switch includes a lever arm projecting from the upper portion of said rod.

8. An improved anti-pollution adapter according to claim 6 further including means to send a warning signal to a remote station upon the delivery of a predetermined weight of overflow being delivered to said container.

* * * * *